United States Patent
Ginzburg et al.

(10) Patent No.: US 7,372,867 B2
(45) Date of Patent: May 13, 2008

(54) METHOD AND APPARATUS TO PROVIDE CHANNEL ACCESS PARAMETER

(75) Inventors: Boris Ginzburg, Haifa (IL); Vladimir Kondratiev, Haifa (IL); Alexander Tolpin, Netanya (IL)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 10/608,067

(22) Filed: Jun. 30, 2003

(65) Prior Publication Data

US 2004/0264423 A1    Dec. 30, 2004

(51) Int. Cl.
H04L 12/413 (2006.01)
H04J 3/02 (2006.01)
H04Q 7/20 (2006.01)

(52) U.S. Cl. ............... 370/447; 370/462; 455/450
(58) Field of Classification Search ........... 370/445, 370/447, 448, 461–462; 455/434, 450
See application file for complete search history.

(56) References Cited

U.S. PATENT DOCUMENTS

| | | | |
|---|---|---|---|
| 6,937,591 B2* | 8/2005 | Guo et al. | 370/338 |
| 6,965,942 B1* | 11/2005 | Young et al. | 709/232 |
| 2002/0110085 A1* | 8/2002 | Ho et al. | 370/230 |
| 2003/0081628 A1* | 5/2003 | Sugar et al. | 370/461 |
| 2004/0093421 A1* | 5/2004 | Peng et al. | 709/232 |

OTHER PUBLICATIONS

Haltao Wu et al.: IEEE 802.11 Distributed Coordination Function (DCF): Analysis and Enhancement: National Key Lab of Switching Technology and Telecommunication Networks: IEEE 2002: Apr. 28, 2002: ISBN: 0-7803-7400-2.
Vitsas V.: "Throughput analysis of linear backoff scheme in wireless LANs"; Electronics Letters, IEE Stevenage, GB, vol. 39, No. 1: Jan. 9, 2003.
International Search Report: PCT/US2004/015584: mailed Oct. 18, 2004.
U.S. Appl. No. 10/668,173, filed Sep. 24, 2003, Ginzburg, Boris.
ANS/IEEE Std 802.11, 1999 Edition, "Local and Metropolitan Area Networks: Wireless LAN".
ANS/IEEE Std 802.11, 1999 Edition, Medium Access Control (MAC) and Physical (PHY) Specifications.
IEEE Std. 802.11e/D4.1, Feb. 2003 (Draft Supplement to IEEE Std 802.11, 1999 Edition). Draft Supplement to Standard for Telecommunications and Information Exchange Between Systems—LAN/MAN Specific Requirements—Part 11: Wireless Medium Access Control (MAC) andPhysical Layer (PHY) specifications: Medium Access (MAC) Enhancements for Quality of SERvice (QoS).

* cited by examiner

*Primary Examiner*—Chi Pham
*Assistant Examiner*—Tri H. Phan
(74) *Attorney, Agent, or Firm*—Pearl Cohen Zedek Latzer, LLP

(57) ABSTRACT

Briefly, a method and apparatus to a channel access parameter to mobile units of a wireless communication network. The channel access parameter may be selected based on the probability of collisions between packets of the wireless network.

34 Claims, 4 Drawing Sheets

METHOD AND APPARATUS TO PROVIDE CHANNEL ACCESS PARAMETER

BACKGROUND OF THE INVENTION

In wired and/or wireless local area networks (e.g. LAN and WLAN, respectively) devices may use an access mechanism to access the network. An example of an access mechanism may be a Carrier Sense Multiple Access with Collision Avoidance (CSMA/CA) and, more specifically, CSMA/CA with a binary exponential backoff method.

In this method, the devices, also termed stations, may use a predefined time slot of a time frame to access the network. This time frame may be known in the art as a contention window (CW). The CW may have two parameters, namely, $CW_{min}$ and $CW_{max}$, wherein $CW_{min}$ may be defined as a minimal size of the CW and $CW_{max}$ may be defined as the maximal size of the CW. The CSMA/CA mechanism may increase $CW_{min}$ until $CW_{max}$ is reached or until receiving an acknowledge (ACK) message indicating successful transmission of a packet. The process of increasing the $CW_{min}$ from its minimum value upward may be repeated for the duration of a transmission of a packet. The optimal CW range depends on the probability of collision in the network. Thus, the fixed pre-defined values of $CW_{min}$ and $CW_{max}$ may result in an incensement of the number of collisions. Furthermore, packets may be unnecessarily delayed before being transmitted. Furthermore, the data throughput in the network may be impaired.

Thus, there is a need for better ways to mitigate the above described disadvantages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
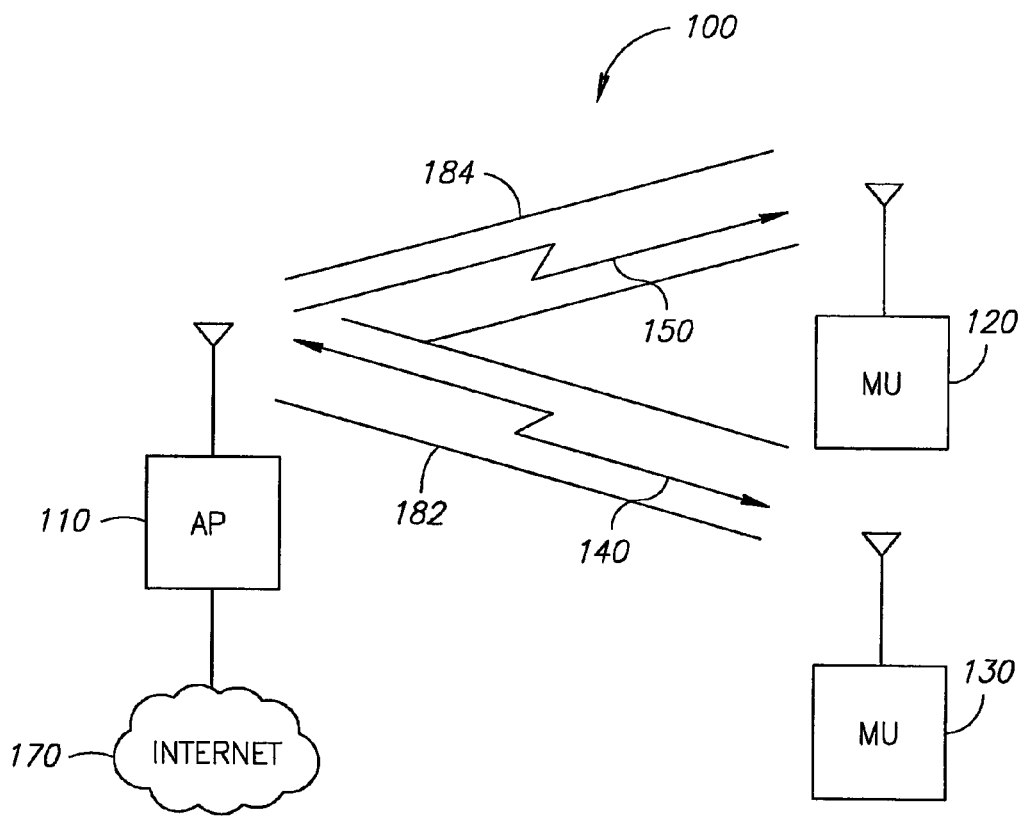
FIG. 1 is a schematic illustration of a wireless communication system that may include a wireless mobile unit according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal frequency-division multiplexing (OFDM) and the like.

Turning to FIG. 1, a wireless communication system 100, for example, a WLAN communication system is shown. Although the scope of the present invention is not limited in this respect, the exemplary WLAN communication system 100 may be defined, e.g., by IEEE 802.11-1999 standard, as a basic service set (BSS). For example, the BSS may include at least one access point (AP) 110 and at least one mobile unit (MU) 130. MUs 130 and 120 may be in communication with one another and/or with the Internet 170 through AP 110. For example, AP 110 may control the communication by sending control commands that may include access parameters via beacons 140, 150, which may be transmitted through channels 182, 184, respectively, if desired. In other embodiments of the present invention, wireless communication system 100 may include two or more APs and two or more MUs, if desired, in which case the arrangement of wireless communication system 100 may be referred to by IEEE 802.11-1999 standard as an extended service set (ESS), although the scope of the present invention is not limited in this respect.

Figure 2:
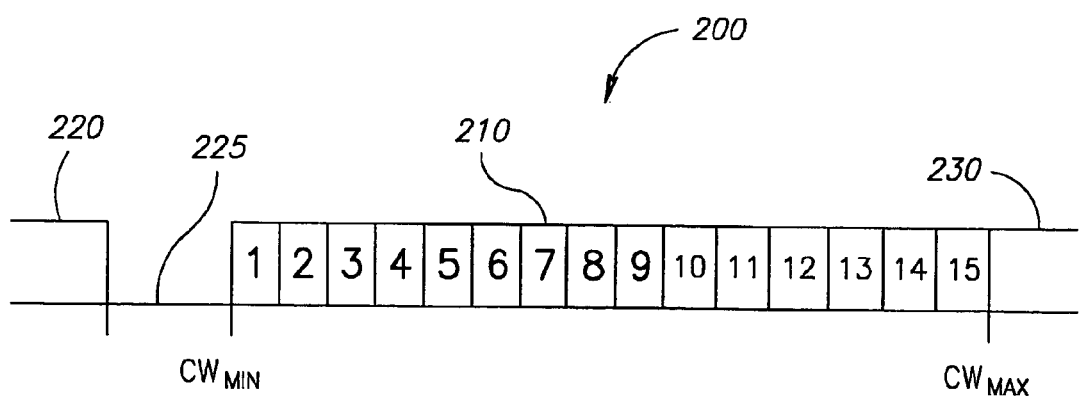
FIG. 2 is a schematic illustration of an exemplary timing diagram of a distributed coordination function (DCF) according to embodiments of the present invention.

Turning to FIG. 2, an illustration of an exemplary timing diagram of a distributed coordination function (DCF) according to embodiments of the present invention is shown. Although the scope of the present invention is not limited in this respect, a CSMA/CA with binary exponential backoff may be used with embodiments of the present invention. This access mechanism may also be known in the art as a "listen before talk" access mechanism that permits MUs and APs to transmit when a wireless station such as, for example, a mobile unit, an access point, etc., may be free from transmission. This mechanism may prevent collisions between transmission from stations (e.g., MUs, APs, etc.) of wireless communication system 100.

Although the scope of the present invention is not limited in this respect, the access mechanism may transmit one or more channel access parameters 200 to stations of wireless communication system 100. In the exemplary timing diagram of FIG. 2, channel access parameter 200 is a contention window (CW). However, in embodiments of the invention, channel access parameter may be $CW_{min}$, $CW_{max}$, a backoff parameter, and the like.

In some embodiments of the present invention, $CW_{min}$ may also be referred as a backoff parameter and adjusting the $CW_{min}$ may be referred as the adjusting the backoff parameter, although the scope of the present invention is in no way limited in this respect.

Although the scope of the present invention is not limited in this respect, CW 200 may include at least two access parameters, e.g., $CW_{min}$ and $CW_{max}$. In some embodiments of the invention, a minimum value of the $CW_{min}$ parameter may be a multiple of 4 of the number of active stations (e.g. active MUs, APs, etc.). $CW_{min}$ may vary from 15 time slots 210 according to IEEE 802.1a standard, or 31 time slots 210 according to IEEE 802.11b standard, to 1023 time slots 210, if desired. Time slots 210 may be marked with a number which may be selected randomly by the CSMA/CA mechanism. In embodiments of the inventions, the binary exponential backoff mechanism of AP 110 may choose a random number, for example, one of time slots 210, which may be allocated to MU 120 for transmission. Based on the random number chosen, for example, slot 210 number 9, MU 120 may wait a predetermined time period which may include a time period 225 and the time until the selected slot (e.g. slots 210 numbered 1 to 8) and the time of selected slot 210, if desired.

Figure 3:
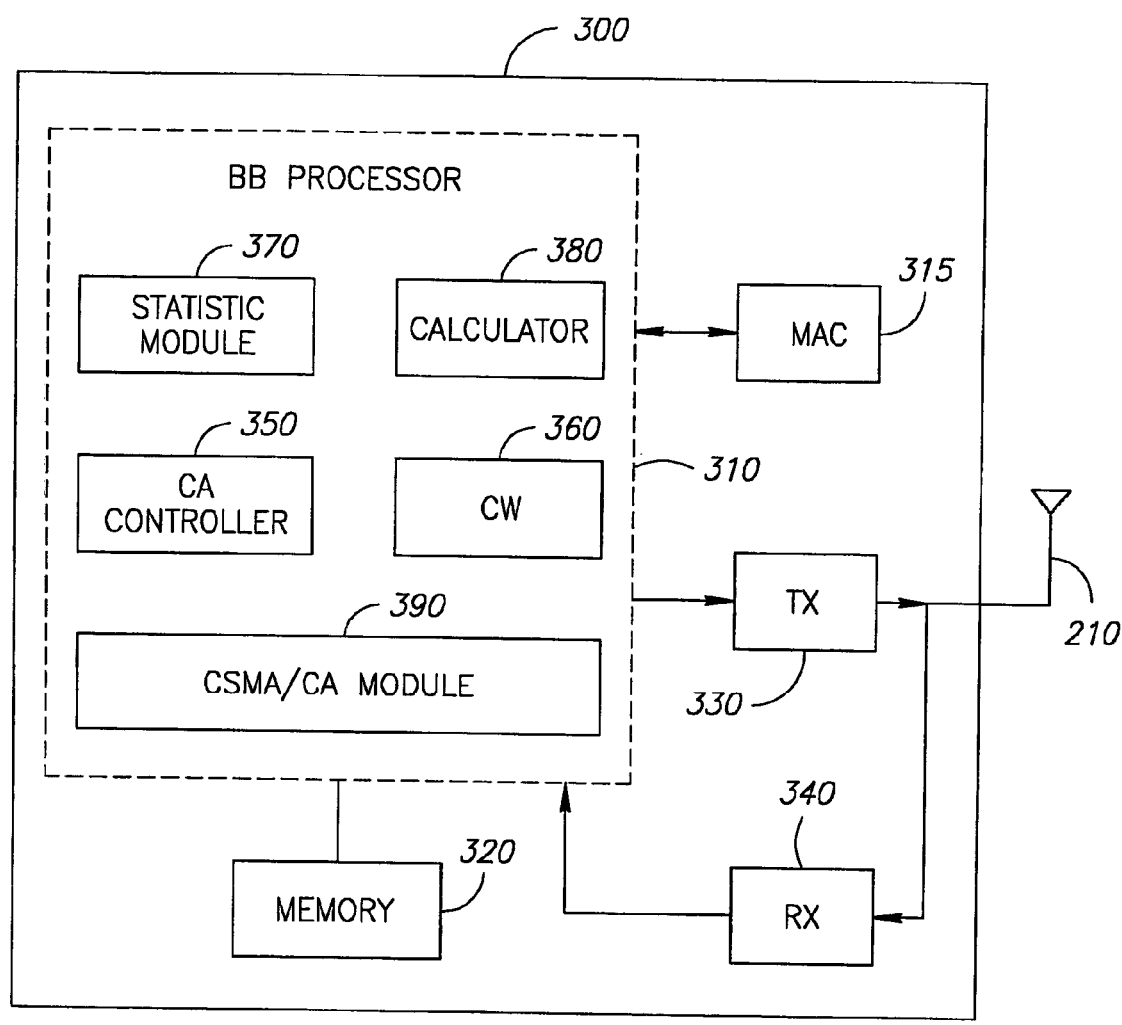
FIG. 3 is a block diagram of a receiver according to an exemplary embodiment of the present invention.

Turning to FIG. 3, a block diagram of an AP 300 according to some embodiments of the present invention is shown. Although the scope of the present invention is not limited in this respect, at least one antenna 310 that may be used to provide a transmission, for example beacon 140, to one or more mobile units, for example MU 120, may be connected to AP 300. Beacon 140 may include at least one channel access parameter, for example, $CW_{min}$, $CW_{max}$. Antenna 310 that may be used with embodiments of the present invention, may be an omni-directional antenna, a monopole antenna, a dipole antenna, an end fed antenna, a circularly polarized antenna, a microstrip antenna, a diversity antenna and the like.

Although the scope of the present invention is not limited in this respect, AP 300 may include a transmitter 330 and a receiver 340, a processor 310, for example a base-band (BB) processor, medium access control (MAC) 315 and a memory 320.

Although the scope of the present invention is not limited in this respect, MAC 315 and BB processor 310 may operate to provide a channel access parameter to MU 120 and/or MU 130 of wireless communication system 100. In some embodiments of the present invention, MAC 315 and BB Processor 310 may include a channel access (CA) controller 350. CA controller 350 may select a channel access parameter from a CW 360. CA controller 350 may dynamically adjust parameters of CW 360, e.g., $CW_{min}$, $CW_{max}$.

In some embodiments of the present invention, receiver 340 may receive packets, for example, one or more packets included in transmission 220. A statistic module 370 may accumulate a packet time of the received packet with a packet time parameter stored in memory 320, if desired. Statistic module 370 may provide the packet time parameter to calculator 380 which may calculate a collision probability parameter 380.

Although the scope of the present invention is not limited in this respect, calculator 380 may estimate a throughput loss parameter based on the packet time parameter and may calculate the probability of collisions based on the estimated throughput loss parameter, if desired. In other embodiment of the invention, calculator 380 may estimate a network load parameter, for example, the network load of wireless communication network 100, based on the packet time parameter and the collision probability parameter. Based on the network load parameter, calculator 380 may estimate the throughput loss parameter, if desired.

Although the scope of the present invention is not limited in this respect, CA controller 350 may operate according to mechanism provided by a CSMA/CA module 390. For example, CSMA/CA module 390 may include a CSMA/CA mechanism incorporating collision avoidance with exponential backoff. CSMA/CA module 390 may control the operation of transmitter 330. CA controller 350 may be adjusted based on a probability of collisions between two or more packets transmitted from at least two MUs, e.g., MUs 120, 130. In addition, CA controller 350 may adjust $CW_{min}$ and $CW_{max}$ based on the network load parameter, if desired.

Although the scope of the present invention is not limited in this respect, in some embodiments of the present invention BB processor 310 may be a digital signal processor or the like. Furthermore, Statistic module 370, calculator 380, CW 360, CSM/CA module 390 and CA controller 350 may be implemented by hardware, by software, or by any suitable combination of hardware and/or software.

Figure 4:
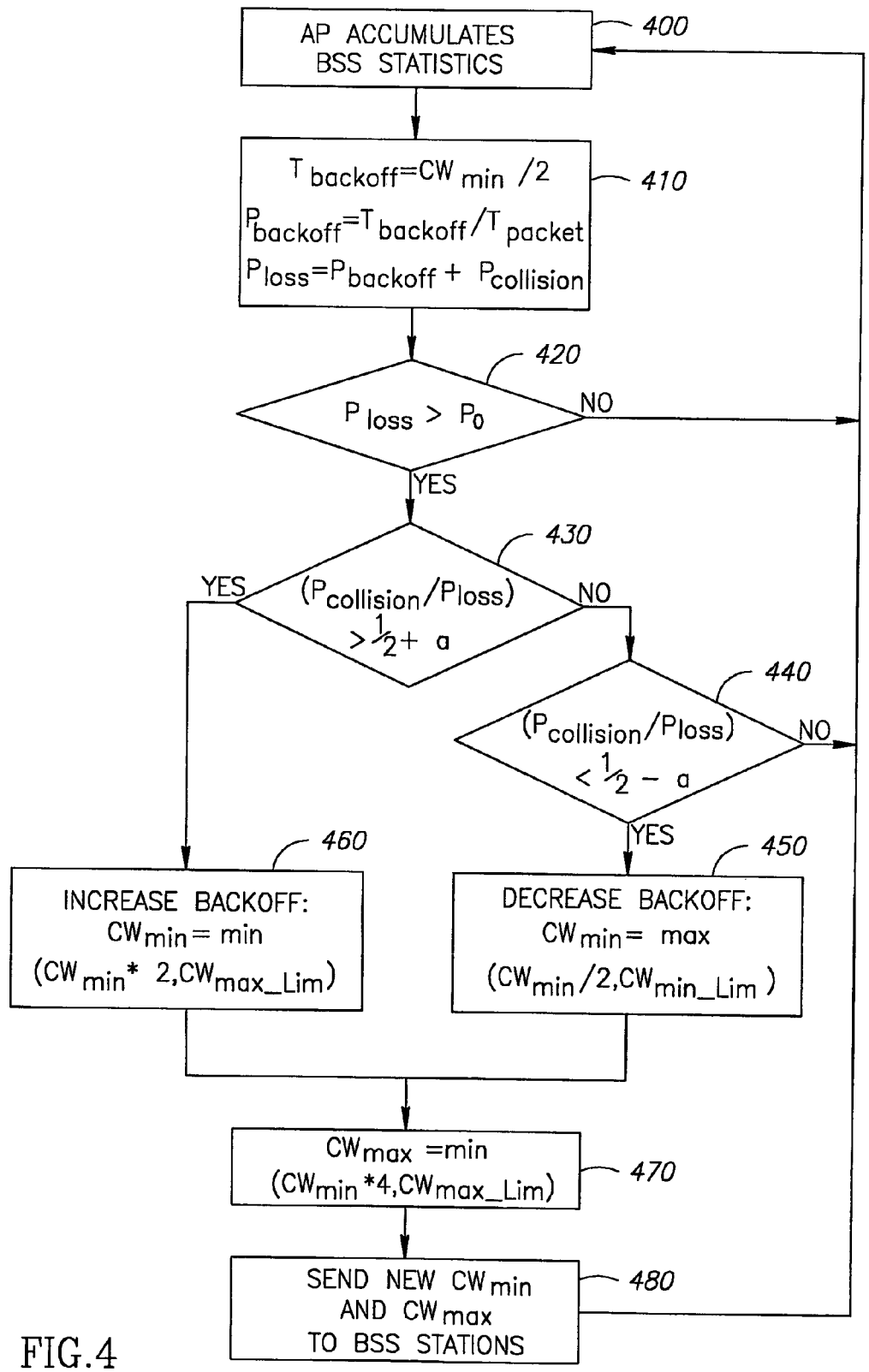
FIG. 4 is a flowchart of a method according to some exemplary embodiments of the present invention.

Turning to FIG. 4 an exemplary method of adjustment of CW parameters according to some embodiment of the present invention is shown. Although the scope of the present invention is not limited in this respect, AP 110 may use the method described below to adjust the CW parameters according to a basic service set (BSS load.

Although the scope of the present invention is not limited in this respect, AP 110 may accumulate the statistics for a period of N beacons, for example, a packet time $T_{packet}$ (block 400). In the end of the period of N beacons, AP 110 may estimate and/or calculate a probability of collisions parameter $P_{collision}$. Accordingly, AP 110 may calculate a backoff time $T_{backoff}$, a backoff parameter $P_{backoff}$, and a throughput loss parameter $P_{loss}$, which may be based on a packet loss statistic, if desired (block 410).

Although the scope of the present invention is not limited in this respect, if desired, AP 110 may calculate $T_{backoff}$, $P_{backoff}$, and $P_{loss}$ according to the following exemplary equations:

$$T_{backoff} = \tfrac{1}{2} CW_{min} \qquad (1)$$

$$P_{backoff} = T_{backoff}/T_{packet} \qquad (2)$$

$$P_{loss} = P_{backoff} + P_{collision} \qquad (3)$$ wherein $T_{packet}$ may be an average time for all transmitted and successfully received packets.

Although the scope of the present invention is not limited in this respect, AP 110 may compare $P_{loss}$ to a predetermined threshold of packet loss, $P_0$ (block 420). In addition, AP 110 may check if a network load as depicted by $P_{collisions}/P_{loss}$ may be above or below a predetermined threshold, for example, $\frac{1}{2}+\alpha$ (block 430, wherein a may be referred to as a hysteresis coefficient, which may be used to avoid jittering, if desired. If the network load is above the predetermined threshold $\frac{1}{2}+\alpha$, AP 110 may increase $CW_{min}$, for example, according to the following exemplary function (block 460):

$$CW_{min}=\min(CW_{min}*2, CW_{max}) \quad (4)$$

If the network load is below the predetermined threshold, $\frac{1}{2}+\alpha$, and also below a second threshold, e.g., $\frac{1}{2}-\alpha$ (block 440), AP 110 may decrease $CW_{min}$, e.g., according to the following exemplary function (block 450):

$$CW_{min}=\max(CW_{min}/2, CW_{min\_Lim}) \quad (5)$$

wherein $CW_{min\_Lim}$ may be the lower limit of $CW_{min}$, if desired.

Although the scope of the present invention is not limited in this respect, AP 110 may dynamical adjust $CW_{min}$, and $CW_{max}$ according to changes in the network load (e.g., $P_{collisions}/P_{loss}$). AP 110 may dynamically adjust $CW_{max}$ according to this exemplary function:

$$CW_{max}=\min(CW_{min}*4, CW_{max\_Lim}) \quad (6),$$

wherein $CW_{max\_Lim}$ may be a maximum value of $CW_{max}$ (block 470). AP 110 may transmit a beacon with the dynamically adjusted parameters $CW_{min}$ and $CW_{max}$ to BSS stations, e.g., MUs 120, 130, if desired (block 480).

Figure 5:
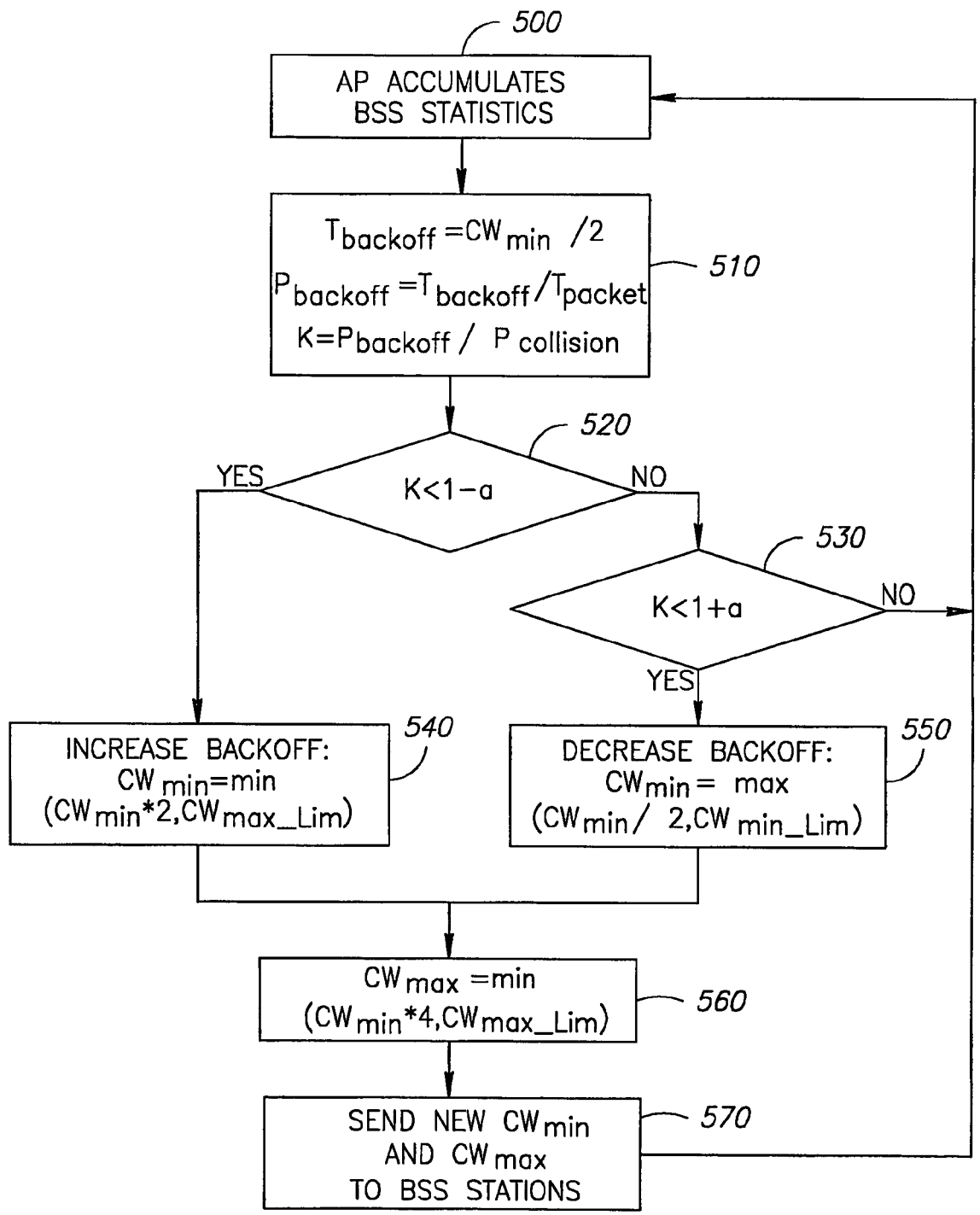
FIG. 5 is a flowchart of a method according to further exemplary embodiments of the present invention.

Turning to FIG. 5 an exemplary method of adjustment of CW parameters according to further exemplary embodiments of the present invention is shown. Although the scope of the present invention is not limited in this respect, the method may dynamically adjust the $CW_{min}$ and $CW_{max}$ based on equilibrium between $P_{backoff}$, which may be related to a channel access backoff mechanism, and $P_{collisions}$, which may be related to collisions between two or more packets, wherein $P_{backoff}$ and $P_{collisions}$ may be referred to as packet loss parameters, if desired. For example, K may be defined as the equilibrium and may be denoted $$K=P_{backoff}/P_{collision} \quad (7).$$

Although the scope of the present invention is not limited in this respect, AP 110 may accumulate the BSS statistic (block 500) and may calculate $T_{backoff}$, $P_{backoff}$ and K based on the statistic (block 510). AP 110 may compare the equilibrium K to a threshold $1-\alpha$ (block 520) and may decrease $CW_{min}$ (block 540) if K is below the $1-\alpha$ threshold. If K is above the $1-\alpha$ threshold, AP 110 may compare equilibrium K to another threshold, e.g., $1+\alpha$ (block 530) and may decrease $CW_{min}$ (block 550) if K is below the $1+\alpha$ threshold, if desired.

Although the scope of the present invention is not limited in this respect, blocks 500, 510, 520, 530 may be repeated for additional received packets in the transmission. AP 110 may adjust $CW_{max}$ based on the adjusted $CW_{min}$ (block 560) and may send $CW_{min}$ and $CW_{max}$ to the BSS station, e.g., MUs 120, 130 (block 570), if desired.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
    selecting a channel access parameter based on a probability of collision between two or more packets, wherein the selecting comprises:
    calculating a throughput loss parameter based on the probability of collision;
    dynamically adjusting a parameter of a contention window based on equilibrium between a time loss parameter related to a channel access backoff mechanism and a packet loss parameter related to a collision between two or more packets;
    calculating an equilibrium parameter;
    comparing the equilibrium parameter to a threshold; and
    adjusting lower and upper limits of the contention window based on the comparison.

2. The method of claim 1, wherein calculating the throughput loss parameter comprises:
    collecting statistics of a packet time to provide an average packet time;
    estimating a collision probability parameter; and
    estimating a network load based on the average packet time and the collision probability parameter.

3. The method of claim 2, comprising:
    estimating the throughput loss parameter based on the network load.

4. The method of claim 1, wherein selecting the channel access parameter comprises:
    dynamically adjusting a parameter of a contention window based on the probability of collision.

5. The method of claim 4, wherein dynamically adjusting the parameter comprises:
    adjusting a backoff parameter based on a network load; and
    adjusting a size of the contention window based on the adjusted backoff parameter.

6. A method comprising:
    dynamically adjusting a parameter of a contention window based on a probability of collision between two or more packets; and
    selecting a channel access parameter based on the adjusted parameter of the contention window, wherein selecting the channel access parameter comprises;
    dynamically adjusting the parameter of the contention window based on an equilibrium between a first packet loss parameter related to a channel access backoff mechanism and a second packet loss parameter related to a collision between two or more packets;
    calculating an equilibrium parameter;
    comparing the equilibrium parameter to a threshold; and
    adjusting the parameter of the contention window based on the comparison.

7. The method of claim 6, wherein selecting comprises:
    calculating the probability of collisions based on an estimated throughput loss parameter which based on the collisions.

8. The method of claim 7, wherein calculating the probability of collisions comprises:
    collecting statistics of a packet time to provide a packet time parameter;
    calculating a collision probability parameter; and
    estimating a network load based on the packet time parameter and the collision probability parameter.

9. The method of claim 8, comprising:
    estimating the throughput loss parameter based on the network load.

10. The method of claim 6, wherein dynamically adjusting the parameter of a contention window based on a probability of collision comprises:
adjusting a backoff parameter based on a network load; and
adjusting a size of the contention window based on the adjusted backoff parameter.

11. An apparatus comprising:
a channel access controller to select a channel access parameter based on a dynamically adjusted parameter of a contention window, wherein the parameter of the contention window is adjustable based on a probability of collision between two or more packets transmitted from at least two mobile units and wherein selecting the channel access parameter comprises:
dynamically adjusting the parameter of the contention window based on an equilibrium between a first packet loss parameter related to a channel access backoff mechanism and a second packet loss parameter related to a collision between two or more packets;
calculating an equilibrium parameter;
comparing the equilibrium parameter to a threshold; and
adjusting the parameter of the contention window based on the comparison.

12. The apparatus of claim 11, further comprising:
a calculator to calculate the probability of collisions based on an estimated throughput loss parameter which based on the collisions.

13. The apparatus of claim 12, wherein calculator comprises:
a statistic module to accumulate a packet time of a received packet to provide a packet time parameter and to calculate a collision probability parameter.

14. The apparatus of claim 13, wherein the calculator is able to estimate a network load based on the packet time parameter and the collision probability parameter and to estimate the throughput loss parameter based on the network load.

15. The apparatus of claim 11, wherein channel access controller is able to adjust a backoff parameter based on a network load and to adjust a size of the contention window based on the adjusted backoff parameter.

16. The apparatus of claim 11, wherein channel access controller is able to operate according to a carrier sense multiple access with collision avoidance with exponential backoff module.

17. The apparatus of claim 11, wherein the channel access parameter is a time slot within the contention window.

18. An apparatus comprising:
an omni-directional antenna to provide a transmission of a channel access parameter to one or more mobile units; and
a channel access controller to select the channel access parameter based on a dynamically adjusted parameter of a contention window, wherein the parameter of the contention window is adjustable based on a probability of collision between two or more packets transmitted from at least two mobile units of the one or more mobile units and wherein selecting the channel access parameter comprises:
dynamically adjusting the parameter of the contention window based on an equilibrium between a first packet loss parameter related to a channel access backoff mechanism and a second packet loss parameter related to a collision between two or more packets;
calculating an equilibrium parameter;
comparing the equilibrium parameter to a thresholds; and
adjusting parameter of the contention window based on the comparison.

19. The apparatus of claim 18, further comprising:
a calculator to calculate the probability of collision based on estimated throughput loss parameter based on the collision.

20. The apparatus of claim 19, wherein the calculator comprises:
a statistic module to accumulate a packet time of a received packet to provide a packet time parameter.

21. The apparatus of claim 20, wherein the calculator is able to estimate a network load based on the packet time parameter and the collision probability parameter and to estimate the throughput loss parameter based on the network load.

22. The apparatus of claim 18, wherein channel access controller is able to adjust a backoff parameter based on a network load and to adjust a size of the contention window based on the adjusted backoff parameter.

23. The apparatus of claim 18, wherein channel access controller is able to operate according to a carrier sense multiple access with collision avoidance with exponential backoff module.

24. The apparatus of claim 18, wherein the channel access parameter is a time slot within the contention window.

25. A wireless communication system comprising:
one or more mobile unit to receive a channel access parameter; and
an access point comprising:
a channel access controller to select the channel access parameter based on a dynamically adjusted parameter of a contention window, wherein the parameter of the contention window is adjustable based on a probability of collisions between two or more packets transmitted front at least two mobile units of the one or more mobile units and wherein selecting the channel access parameter comprises:
dynamically adjusting the parameter of the contention window based on an equilibrium between a first packet loss parameter related to a channel access backoff mechanism and a second packet loss parameter related to a collision between two or more packets;
calculating an equilibrium parameter;
comparing the equilibrium parameter to a threshold; and
adjusting the parameter of the contention window based on the comparison.

26. The wireless communication system of claim 25, wherein the access point comprises:
a calculator to calculate the probability of collisions based on estimated throughput loss parameter which based on the collisions.

27. The wireless communication system of claim 26, wherein the calculator comprises:
a statistic module to accumulate a packet time of a received packet to provide a packet time parameter and to calculate a collision probability parameter.

28. The wireless communication system of claim 27, wherein the calculator is able to estimate a network load based on the packet time parameter and the collision probability parameter and to estimate the throughput loss parameter based on the network load.

29. The wireless communication system of claim 25, wherein the channel access controller comprises a carrier sense multiple access with collision avoidance with exponential backoff module.

30. The wireless communication system of claim 25, wherein the channel access parameter is a time slot within the contention window.

31. An article comprising: a computer readable medium, having stored thereon instructions, that when executed by a computer, result in:
   dynamically adjusting a parameter of a contention window based on probability of collisions between two or more packets; and
   selecting a channel access parameter based on the adjusted parameter of the contention window wherein selecting the channel access parameter comprises:
   dynamically adjusting the parameter of the contention window based on an equilibrium between a first packet loss parameter related to a channel access backoff mechanism and a second packet loss parameter related to a collision between two or more packets; and further comprising:
   calculating an equilibrium parameter;
   comparing the equilibrium parameter to a threshold; and
   adjusting the parameter of the contention window based on the comparison.

32. The article of claim 31 wherein the instructions when executed, result in:
   calculating the probability of collisions based on an estimated throughput loss parameter which based on the collisions.

33. The article of claim 32 wherein the instructions when executed, result in:
   estimating the throughput loss parameter based on a network load.

34. The article of claim 31 wherein the instruction of dynamically adjusting the parameter of a contention window based on a probability of collision when executed, further result in:
   adjusting a backoff parameter based on a network load; and
   adjusting a size of the contention window based on the adjusted backoff parameter.

* * * * *